US006892900B2

(12) United States Patent
Drechsel

(10) Patent No.: US 6,892,900 B2
(45) Date of Patent: May 17, 2005

(54) VALVE

(76) Inventor: Arno Drechsel, Gasserstrasse 3, A-9900 Lienz (AT)

( * ) Notice: Subject to any disclaimer, the term of this patent is extended or adjusted under 35 U.S.C. 154(b) by 153 days.

(21) Appl. No.: 10/332,316

(22) PCT Filed: Jul. 10, 2001

(86) PCT No.: PCT/AT01/00229

§ 371 (c)(1),
(2), (4) Date: Jan. 7, 2003

(87) PCT Pub. No.: WO02/04848

PCT Pub. Date: Jan. 17, 2002

(65) Prior Publication Data

US 2004/0089827 A1 May 13, 2004

(30) Foreign Application Priority Data

Jul. 11, 2000 (AT) ........................................ A 1189/2000

(51) Int. Cl.[7] .............................. B67D 5/08; F16K 7/04
(52) U.S. Cl. ...................... 222/55; 222/214; 137/487.5; 239/67; 251/7; 251/282
(58) Field of Search .............................. 222/52, 55, 63, 222/214, 504; 239/67, 68, 576, 586; 137/487.5, 488; 251/4, 5, 7, 8, 282

(56) References Cited

U.S. PATENT DOCUMENTS

| 3,685,538 | A | | 8/1972 | Sullivan ..................... 137/504 |
|---|---|---|---|---|
| 4,442,954 | A | * | 4/1984 | Bergandy ..................... 222/55 |
| 4,662,540 | A | * | 5/1987 | Schroter ..................... 222/55 |
| 5,067,506 | A | * | 11/1991 | Ball et al. ................ 137/487.5 |
| 5,161,777 | A | * | 11/1992 | Kawasaki et al. ........ 137/487.5 |
| 5,172,547 | A | | 12/1992 | Lawrence et al. ............. 60/234 |
| 5,326,033 | A | | 7/1994 | Anfindsen ..................... 239/61 |
| 5,379,790 | A | | 1/1995 | Bruce et al. .................... 137/1 |
| 5,730,323 | A | * | 3/1998 | Osborne ..................... 222/55 |
| 5,950,667 | A | * | 9/1999 | Nicewonger et al. ..... 137/487.5 |
| 5,967,176 | A | * | 10/1999 | Blann et al. ................. 137/488 |
| 6,568,416 | B2 | * | 5/2003 | Tucker et al. ............. 137/487.5 |
| 6,705,553 | B2 | * | 3/2004 | Drechsel ...................... 239/67 |

FOREIGN PATENT DOCUMENTS

| DE | 2611571 | 3/1976 |
|---|---|---|
| EP | 0 309 886 | 4/1989 |
| EP | 637707 | 2/1995 |
| WO | 00 27539 | 5/2000 |

OTHER PUBLICATIONS

Austrian Search Report dated Jul. 27, 2000.

* cited by examiner

Primary Examiner—Eric Keasel
(74) Attorney, Agent, or Firm—Notaro & Michalos P.C.

(57) ABSTRACT

The invention relates to a valve (21) for a fluid or gaseous medium, with a displaceable valve body (8), by means of which the clear flow cross-section is adjustable. The valve (21), viewed in the direction of flow, comprises a pressure sensor (1) up- or down-stream of the valve body (8), to record the pressure of the medium and the valve body (8) is controlled depending on a signal from the pressure sensor (1) and/or an external controller (2).

25 Claims, 3 Drawing Sheets

Figure 1:
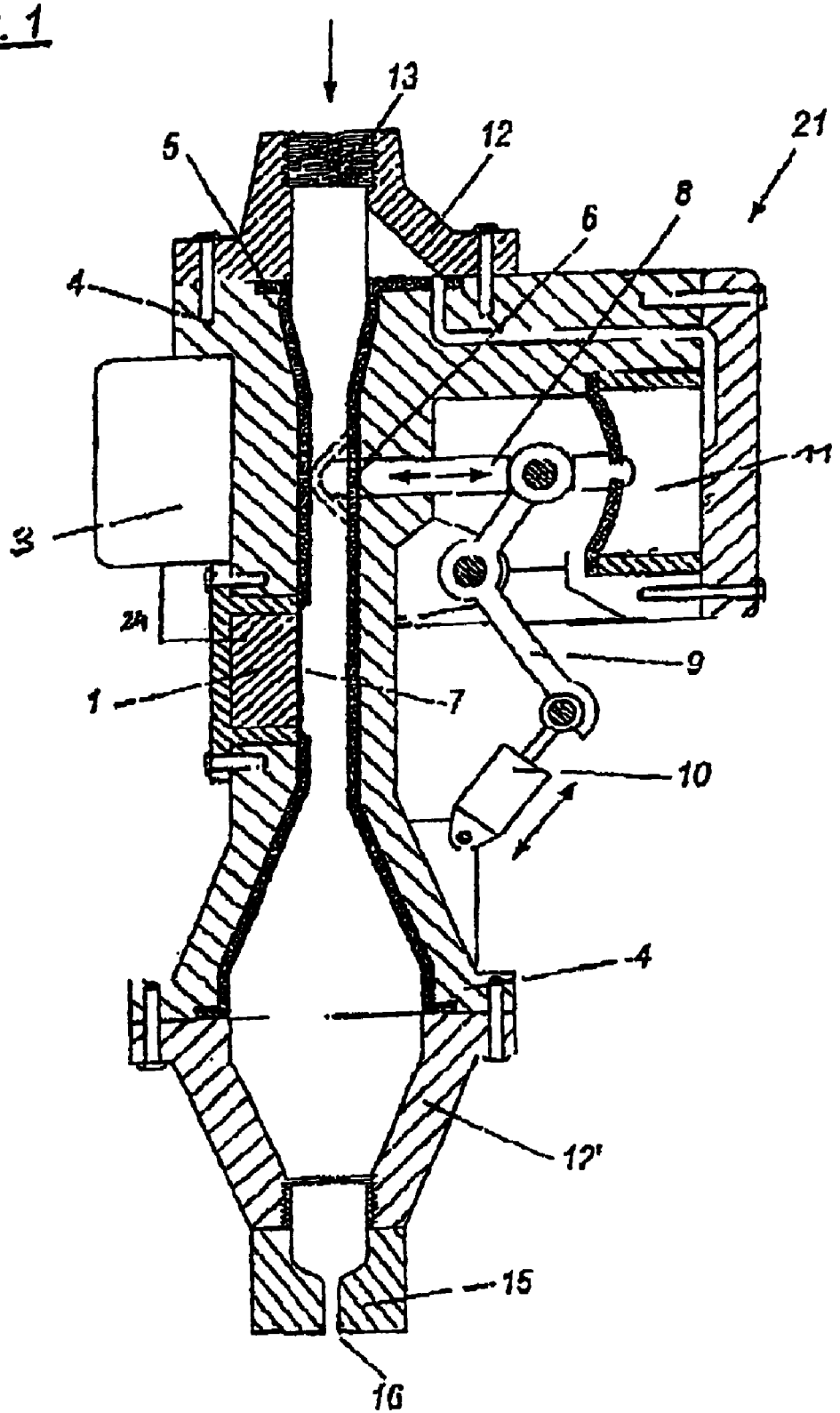

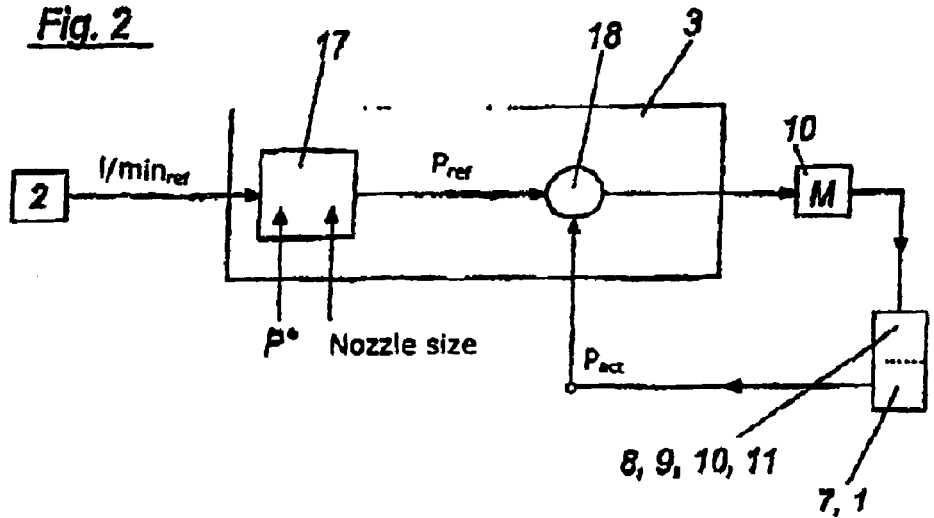
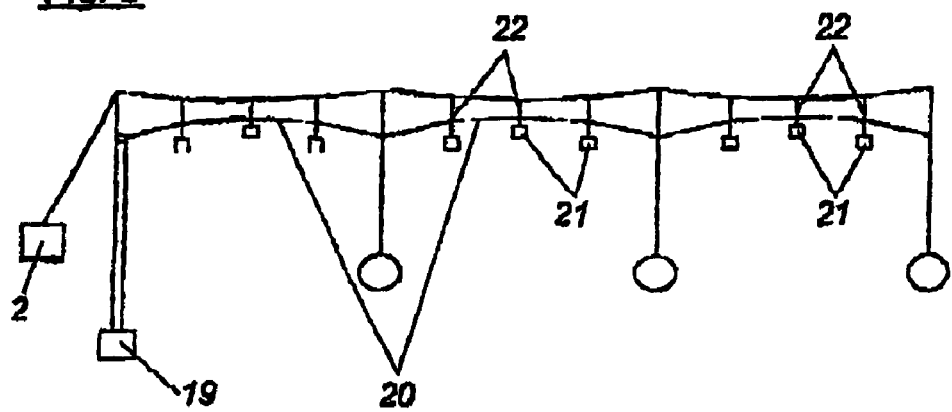

VALVE

The invention concerns a valve for a liquid or gaseous medium comprising a movable valve body, by way of which the internal through-flow cross-section is adjustable.

Valves of that kind are known and are used in many sectors in the water economy or industry, in which water or other liquid media, possibly also gaseous media, have to be precisely controlled, metered and distributed. The known pressure regulators are designed in such a way that they keep the pressure constant over a predefined volume flow. Under the condition that there is an adequate volume flow, this means that a downstream-disposed nozzle is acted upon by the required (calculated) pressure. In practice however both parameters consisting of pressure flow and volume flow are found to be variable.

Therefore the object of the invention is to provide a valve which, even with a variable volume flow, can act on a downstream-disposed nozzle with a constant or a defined variable pressure.

According to the invention that is achieved in that—viewed in the through-flow direction—the valve has upstream and/or downstream of the valve body a pressure sensor for detecting the pressure of the medium and the valve body is regulated in dependence on the signal from the pressure sensor and/or an external control unit, in which respect it has proven to be particularly advantageous if the regulating device is arranged directly at the valve, for example in the form of an electronic circuit on a circuit board.

The fact that the valve has its own regulating circuit makes it possible to provide for controlled variable pressure regulation. This means that the amount of water issuing from the nozzle disposed downstream of the valve no longer has to be determined, as hitherto, by way of replacing nozzles with different nozzle diameters, but on the contrary it is simply regulated with the pressure in the case of a given nozzle. If, as in accordance with a further embodiment of the invention, the regulating device is adapted for stepless regulation of the pressure and/or for switching the valve on/off, a valve of that kind embodies two components in one construction, namely a pressure regulator and an on/off valve.

A particularly advantageous embodiment involves a valve having a valve housing in which are arranged a flexible hose and as the valve body a pinch device for continuously throttling the through-flow of the flow medium, wherein a pressure sensor is arranged upstream and/or downstream of the pinch location and the pinch device is regulated in dependence on the signal from the pressure sensor and/or an external control unit.

In order not to falsify pressure values, a further embodiment can provide that the wall thickness of the hose is reduced to a minimum in the contact region with the pressure sensor arranged outside the hose. For that purpose it has proven to be particularly advantageous if the valve housing has at least two central guides which are oriented substantially transversely with respect to the longitudinal direction of the hose and in which the pressure sensor and parts of the pinch device are arranged so that, besides a simple structure, this additionally affords protection for the delicate pressure sensor.

In accordance with a further aspect of the invention the pinch device can be hydraulically actuable, thereby providing for particularly exact adjustment of the reference pressure. In order however to keep the structure as simple and maintenance-free as possible, a further embodiment of the invention can provide that the pinch device is electrically actuable. In that case it has been found to be particularly desirable if the pinch device includes at least one slider, a lever and a motor, preferably a servomotor, wherein the motor drives the lever and the lever actuates the slider which presses shut or opens the hose through-flow passage. Electrical actuation of the slider by way of a servomotor provides an environmentally friendly and approximately maintenance-free structure.

In accordance with a further aspect of the invention it can be provided that the valve body is adapted to be actuable by a piston which can be acted upon at both sides, wherein the piston is arranged in a piston housing and at least one chamber can be acted upon with a variable pressure by way of a control valve. A technically simple structure is afforded if the control valve is driven by a linear drive, for example a servomotor or voice coil motor, the linear drive being regulated in dependence on the signal from the pressure sensor. In that respect it has been found particularly advantageous if the control valve is in the form of a conical needle and is arranged in a communicating passage, by way of which the regulating medium is fed to the chamber.

The invention further seeks to provide an apparatus for the discharge over a large area of liquid media, in particular water, comprising a central liquid source, a liquid conduit system, a central control unit and electrical control lines to individual valves at a plurality of distributed discharge locations of the liquid conduit system.

Preferably the valve according to the invention is used in relation to a sprinkler or watering system in order to achieve precise controlled distribution of water. With precision watering of that nature parameters measured for example by moisture or temperature sensors and/or satellite monitoring are analysed by the system and the necessary delivery of water is accordingly regulated differently with pinpoint accuracy and thus valuable water is saved. In addition a watering system equipped with such regulating valves according to the invention permits both the linear operation and also circular operation with the same nozzle equipment.

In order to be able to specifically switch individual nozzles on or off, in accordance with a further alternative configuration of the apparatus according to the invention it can be provided that at least a part of the valves can be individually continuously adjusted in respect of through-flow quantity and/or switched on/off, so that no additional valves with expensive and complicated solenoid control have to be fitted.

Figure 4:
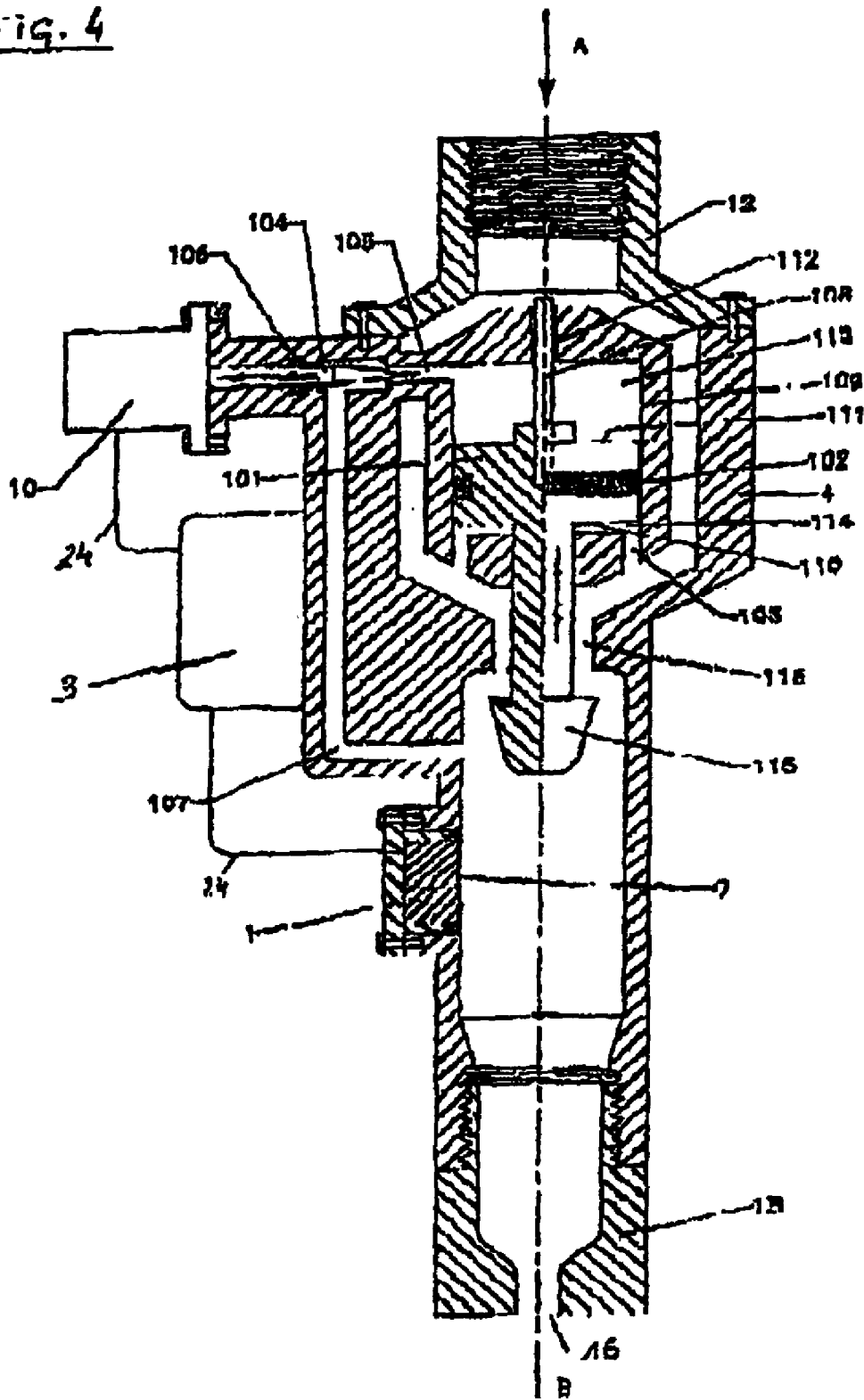

Further advantages and features of the invention are described in greater detail hereinafter with reference to the specific description. In the drawings:

FIG. 1 is a diagrammatic view in section through a valve according to the invention, FIG. 2 is a diagrammatic representation of a regulating circuit, FIG. 3 is a diagrammatic view of an apparatus for the discharge over a large area of liquid media, and FIG. 4 shows a diagrammatic view of a further embodiment.

The valve 21 shown in FIG. 1 comprises a profiled rubber hose 5 which in principle is flat and which is shaped round towards the ends, for the sake of simplicity of manufacture. The hose 5 is embedded in a valve housing 4 which has two guides 6 which afford access to the hose 5. Fitted in the upper guide 6 is a slider 8 which is displaced by way of a lever 9 which is driven by a servomotor 10 or voice coil motor and presses the hose 5 shut (broken line) or opens it. The lower guide 6 serves as a seat for the pressure sensor 1. In the contact region 7 with the pressure sensor 1 the wall thickness of the hose 5 is reduced to the minimum. The regulating device 3 is mounted in the form of an electronic circuit on a circuit board to the housing 4 of the valve 21. The valve housing 4 is closed upwardly and downwardly by connecting sleeves 12, 12' so that the pressure regulating valve 21 is ready to be installed. The upper sleeve 12 has a feed flow opening 13 through which the medium to be regulated is introduced, A nozzle 15 with a nozzle opening 16 is arranged downstream of the valve 21, connected to the lower sleeve 12'.

In the valve illustrated in FIG. 1 the valve body substantially comprises the slider 8 and the hose portion which is pressed in by the slider, Alternatively it would be possible to use the slider directly as the valve body, without a hose, in which case then suitable seals are required.

The mode of operation of the valve 21 according to the invention is described in greater detail hereinafter by means of the regulating device 3 shown in FIG. 2, The regulating device 3 has a storage means 17 and a regulator 18. The storage means 17 receives a through-flow amount in l/min by way of an external control unit 2 or from the user, and stores the resulting system pressure and the nozzle size. From those values, it calculates the $P_{ref}$ which it passes to the regulator 18. The pressure sensor 1 which is fitted in the valve 21 detects the $P_{act}$ and passes the value to the regulator 18 of the regulating device 3. In dependence thereon the motor 10 is operated, which in turn actuates the slider which compresses the hose 5 to such an extent until the required pressure $P_{ref}$ is set.

In the case of the apparatus shown in FIG. 3 the valves 21 are connected by way of a liquid conduit system 20 to a central liquid source 19. All pressure regulating valves 21 are also connected by control lines 22 to an external control unit 2. In addition the valves 21 can be connected by a detection line which makes it possible to simply replace valves 21 in the case of a defect without losing the coding.

In the valve shown in FIG. 4 the flow medium passes through the intake A into the valve. The fluid flows around the piston housing 109, and in that situation water flows through the opening 112, the gap between the pin 108 and the valve body 109, into the chamber 113 and acts on the top side 111 of the piston 101. A force is produced downwardly, in the direction of flow. The purpose of the pin 108 is to keep the fine gap 112 free of deposits and sediment, with its movements. At the same time the medium flows through the lower openings 103 into the chamber 114 and acts on the underside 110 of the piston 101. An upward force is produced. The two chambers 113 and 114 are separated by a sealing element 102, preferably by a diaphragm, in order to keep the pressures in the chambers 113 and 114 separate from each other. The piston 101 can move axially up and down. Disposed at the lower end is a thrust rod 115 which, in dependence on the position of the piston 101, entirely opens or closes the opening 116 and in that respect produces a pressure drop, depending on the respective position of the piston 101.

The pressure sensor 1 which is separated from the water by a thin rubber diaphragm 7 measures the pressure present and passes the actual value to the regulating device 3 where it is compared to the reference value. The regulating device 3 subsequently passes a signal to the linear drive 10 by way of the control line 24. That linear drive 10 can be a servomotor or a voice coil motor. A needle 104 which tapers towards the end is moved axially in relation to the communicating passage 105 by the linear drive 10. The communicating passage 105 communicates the pressure chamber 113 with the passage 107 which returns the regulating medium again. The needle 104 is sealed by sealing elements 106, preferably a diaphragm.

The valve is regulated by way of the differential pressure which is produced between the gap 112 and the communicating opening 105 which is constricted by the needle. In that case the pressure in the two chambers 113 and 114 is set such that the piston 101 comes to a halt in a given position. In that case the thrust rod 115 is so positioned with respect to the opening 116 that the reference pressure value is achieved. When the needle 104 closes the communicating opening 105 the force produced by the piston face 111 is greater than the force produced by the piston face 114, and the valve is entirely open. That is the case as long as the intake pressure at A is lower than the desired reference pressure. If the needle 104 is entirely arrested and the communicating opening 105 is entirely free, the force produced by the piston face 114 predominates. The piston 101 is displaced upwardly, in that case the thrust rod 115 closes the opening 116 and the valve is shut.

Each position of the needle 104 which does not entirely close or entirely open the communicating opening 105 produces a pressure difference which moves the piston 101 into a given position. In a manner corresponding thereto the opening 116 which is opened by the thrust rod produces the desired pressure drop to achieve the reference pressure value which is required to produce a given volume flow through the fixed nozzle 15.

It will be self-evident that the invention is not limited to these specific embodiments by way of example. On the contrary all materials and alternative configurations which are suitable for carrying the concept of the invention into effect can be used.

What is claimed is:

1. A valve for a liquid or gaseous medium comprising a movable valve body, by way of which the internal through-flow cross-section is adjustable, wherein the valve has a pressure sensor for detecting the pressure $P_{(act)}$ of the medium, wherein the detected pressure $P_{(act)}$ is passed from the pressure sensor in the form of electrical signals and is supplied to a regulating device whose regulator operates the valve body in dependence on the signal from the pressure sensor, wherein the regulating device ascertains a pressure reference value $P_{(ref)}$ which it presets for its regulator, wherein viewed in the through-flow direction, the pressure sensor is arranged downstream of the valve body and the stem of the valve body is operatively connected at the drive side to a pressure chamber, wherein the pressure chamber is connected by way of a conduit or a through-flow opening to the intake-side volume flow of the liquid or gaseous medium and is acted upon thereby with pressure.

2. A valve as set forth in claim 1, wherein a nozzle with a fixed nozzle opening is arranged at the discharge side of the valve on the valve housing.

3. A valve as set forth in claim 1, wherein the regulating device ascertains the pressure reference value $P_{(ref)}$ in dependence on the reference through-flow amount (l/min$_{ref}$) with inclusion of the nozzle opening of the downstream-disposed nozzle.

4. A valve as set forth in claim 1, wherein the regulating device is adapted for stepless regulating of the pressure $P_{(act)}$.

5. A valve as set forth in claim 1, wherein the regulating device is adapted for switching the valve on/off.

6. A valve as set forth in claim 1, wherein the regulating device is adapted for switching the valve on/off and for stepless regulating of the pressure $P_{(act)}$.

7. An apparatus for the discharge over a large area of liquid media comprising a central liquid source, a liquid conduit system, a central control unit and electrical control lines to individual valves at a plurality of distributed discharge locations of the liquid conduit system, wherein each of the individual valves comprises a valve as set forth in claim 1.

8. A valve as set forth in claim 1, wherein a nozzle is provided in a releasable nozzle body.

9. A valve as set forth in claim 8, wherein the nozzle is provided in a screwable nozzle body.

10. A valve as set forth in claim 1, wherein the regulating device is arranged directly at the valve housing.

11. A valve as set forth if claim 10, wherein the regulating device is in the form of an electronic circuit on a circuit board.

12. A valve as set forth in claim 1, wherein the valve body is adapted to be actuable by a piston which can be acted upon at both sides, wherein the piston is arranged in a piston housing and at least one chamber can be acted upon by way of a control valve with a variable pressure.

13. A valve as set forth in claim 12, wherein the control valve is in the form of a conical needle and is arranged in a communicating passage, by way of which the regulating medium is fed to the chamber.

14. A valve as set forth in claim 12, wherein arranged in the piston housing for each chamber is at (east one through opening for the liquid or gaseous medium.

15. A valve as set forth in claim 1, including a valve housing in which are arranged a flexible hose and a pinch device as the valve body for continuously throttling the through-flow of the flow medium, and wherein arranged downstream of the pinch location is the pressure sensor which transmits the detected pressure $P_{(act)}$ in the form of electrical signals and the pinch device is regulated in dependence on the signal from the pressure sensor, wherein the regulating device presets the pressure reference value $P_{(ref)}$.

16. A valve as set forth in claim 15, wherein the valve housing has at least two central guides which are oriented substantially transversely with respect to the longitudinal direction of the hose and in which the pressure sensor and parts of the pinch device are arranged.

17. valve as set forth in claim 15, wherein the wail thickness of the hose is reduced in the contact region with the pressure sensor arranged outside the hose.

18. A valve as set forth in claim 15, wherein the pinch device is hydraulically and electrically actuable.

19. A valve as set forth in claim 15, wherein the pinch device is hydraulically actuable.

20. A valve as set forth in claim 19, wherein the pinch device includes at least one slider, a lever and a motor, wherein the motor drives the lever and the lever actuates the slider which presses shut or opens the hose through-flow.

21. A valve as set forth in claim 20, wherein the motor is a servomotor.

22. A valve as set forth in claim 15, wherein the pinch device is electrically actuable.

23. A valve as set forth in claim 22, wherein the pinch device includes at least one slider, a lever and a motor, wherein the motor drives the lever and the lever actuates the slider which presses shut or opens the hose through-flow.

24. A valve as set forth in claim 23, wherein the motor is a servomotor.

25. A valve as set forth in claim 24, wherein the control valve is driven by a linear drive, wherein the linear drive is regulated in dependence on the signal from the pressure sensor.

* * * * *